United States Patent [19]

Zimmerman, II et al.

[11] Patent Number: 5,586,782

[45] Date of Patent: Dec. 24, 1996

[54] DUAL PRESSURE SIDE IMPACT AIR BAG

[75] Inventors: Ronald A. Zimmerman, II, Rochester; John C. Hofer, Novi; Douglas E. Medvedik, Lake Orion; Eric D. Veggian, Troy; Michael J. Lachat, Macomb Township, all of Mich.

[73] Assignee: AlliedSignal Inc., Morristown, N.J.

[21] Appl. No.: 494,657

[22] Filed: Jun. 26, 1995

[51] Int. Cl.⁶ ................................................. B60R 21/22
[52] U.S. Cl. ................................... 280/730.2; 280/743.1
[58] Field of Search .......................... 280/728.1, 729, 280/730.1, 730.2, 736, 739, 742, 743.1, 743.2

[56] References Cited

U.S. PATENT DOCUMENTS

| | | | |
|---|---|---|---|
| 3,768,830 | 10/1973 | Hass | 280/729 |
| 3,795,414 | 3/1974 | Ventre et al. | 280/730.1 |
| 3,892,425 | 7/1975 | Sakairi et al. | 280/743.1 |
| 4,262,931 | 4/1981 | Strasser et al. | 280/730.1 |
| 5,129,675 | 7/1992 | Wang | 280/743.1 |
| 5,160,164 | 11/1992 | Fischer et al. | 280/743.2 |
| 5,240,283 | 8/1993 | Kishi et al. | 280/743.1 |
| 5,282,646 | 2/1994 | Melvin et al. | 280/729 |
| 5,310,214 | 5/1994 | Cuevas | 280/730.1 |
| 5,375,878 | 12/1994 | Ellerbrok | 280/743.1 |

FOREIGN PATENT DOCUMENTS

| | | | |
|---|---|---|---|
| 6-1188 | 1/1994 | Japan | 280/743.2 |

Primary Examiner—Paul N. Dickson
Attorney, Agent, or Firm—Markell Seitzman

[57] ABSTRACT

An air bag for protecting the side and head of an occupant during a side impact collision including: a first side panel (42a) joined to a second panel (42b) and having a neck portion (52) for receipt of inflation gas for a cooperating inflator (30). The air bag characterized in that its upper portion is pressurized to a greater level than a lower portion. A corresponding upper portion of each panel may be coated or alternatively the air bag may include a separator (46) or seam (46,66) to divert a predetermined amount of inflation gas into one of the other chambers.

12 Claims, 4 Drawing Sheets

DUAL PRESSURE SIDE IMPACT AIR BAG

BACKGROUND AND SUMMARY OF THE INVENTION

The present invention relates generally to vehicle safety systems and more particularly to air bags and modules for protecting an occupant during a side impact collision.

Various side impact protection systems have been proposed as illustrated in U.S. Pat. Nos. 5,251,931, 5,324,072, and 4,946,191. In some of these systems the air bag is stored within the vehicle side door while in others the air bag is stored within the seat or head rest. Some air bags are designed to protect only the upper torso or the head of an occupant while others are sufficiently large to protect both. By studying the dynamics of a side impact crash it can be seen that the dynamic loading to the neck and head typically occurs later in time than the dynamic load to the side or lower torso of the occupant. As such it is desirable to provide an air bag in which inflation occurs rapidly to protect the side of the occupant and inflation gas is stored or communicated in the bag or bag section to protect the occupant's head.

It is an object of the present invention to provide an air bag for protecting an occupant during a side impact crash or collision. A further object of the invention is to provide for side impact protection using a bag in which a top portion or region of the air bag is filled to a higher pressure than a lower portion of the bag that typically comes into contact with the thorax of the body.

Accordingly, the invention comprises: an air bag comprising: a first side panel joined to a second panel and having a neck portion for receiving inflation gas from a cooperating gas inflator and first means for achieving a higher pressure in an upper chamber of the bag than in a lower chamber of the bag. This means may include coating the upper portion of each bag to insure that air flow through this portion is restricted or channeling a greater amount of inflation gas into the upper or head portion or the air bag to protect the occupant's head or by using a series of vents and valves separating a lower portion of the bag from the upper portion of the bag and selectively permitting inflation gas to enter into the upper portion of the bag. In addition, the first means may be obtained by using a tether that separates the air bag into an upper and lower chamber and which also acts to divert inflation gas into each chamber. The first means may also include a narrow seam or one elliptically shaped to channel inflation gas to one or the other chamber. Either seam may also be segmented to provide for flow passages between the chambers. In one embodiment inflation gas flows directly into both chambers while in another embodiment inflation gas is directed only into the lower chamber.

DETAILED DESCRIPTION OF THE DRAWINGS

Figure 1:
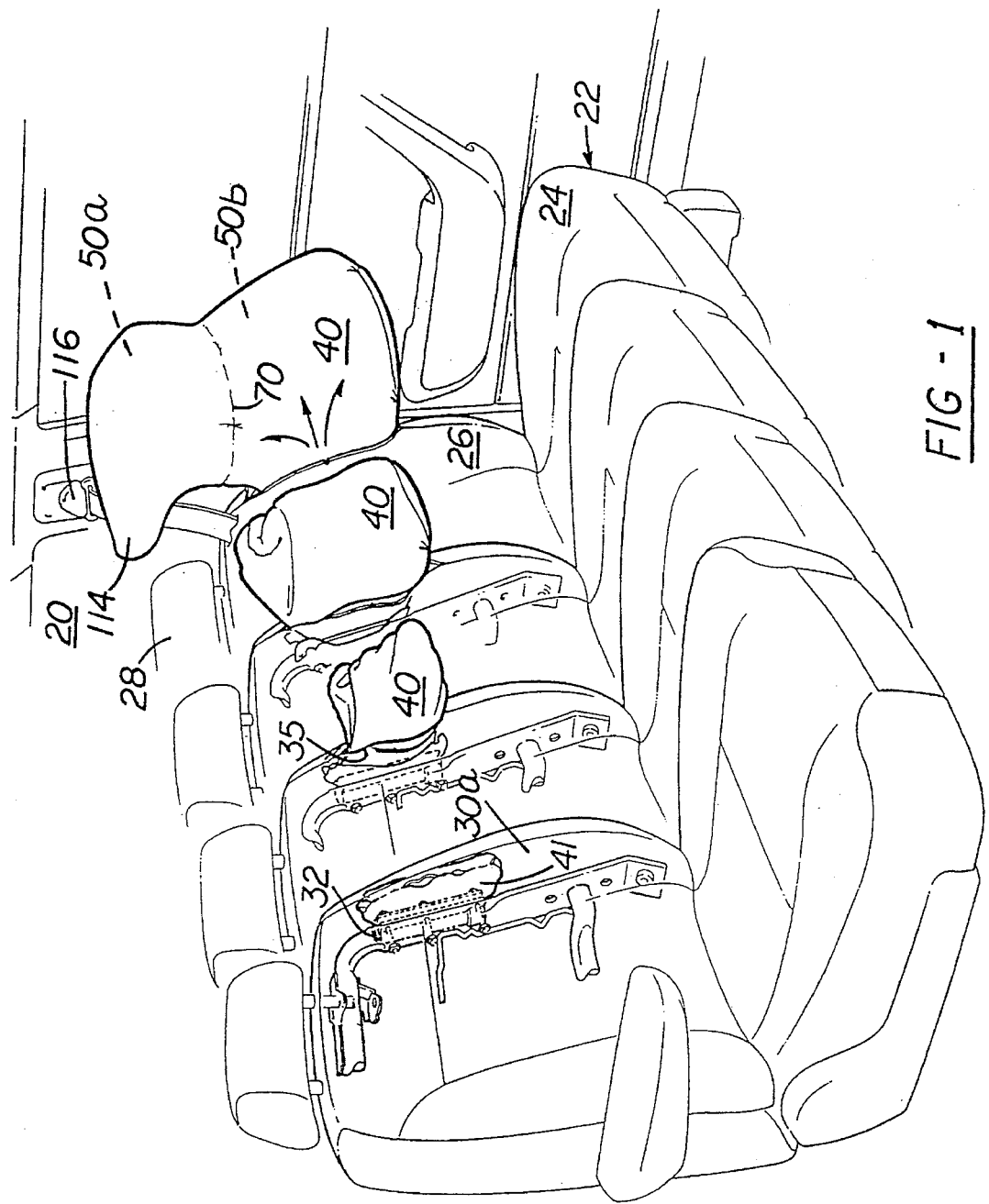
FIG. 1 shows a view of an interior of a vehicle and illustrates some of the major components of the present invention.

Reference is made to FIG. 1 which illustrates a view of the interior of a typical vehicle 20. Shown therein is a seat 22 having a cushion 24, a back portion 26 and a head rest portion 28. This figure shows the various stages of air bag inflation by illustrating the seat and air bag and appears to illustrate four seats. This is not the case, there is only one seat illustrated showing the various staging of air bag inflation. Positioned in the outboard side 30a of the seat back 26 is an air bag inflator 32 secured to an internal part of the seat's support structure. The inflator may be directly mounted to the seat or received within a perforated holder or manifold which is attached to the seat structure. The inflator may be one of a hybrid inflator which communicates heated inflation gas to the air bag or an inflator that uses a solid propellant such as sodium azide, or other type of inflator. Prior to activation of the inflator 32 an associated air bag 40 is maintained in a compact, folded condition (the apparent left most seat) within the outboard side of the seat. The airbag is covered by a tearable flexible covering material 41. Subsequent to sensing an impact with the side of the vehicle, by using an impact sensor of known variety, the inflator 32 is activated thereby releasing or generating inflation gas which fills the air bag. The filling air bag ruptures a tear seam 35 provided in the upholstery of the seat. As the bag inflates it becomes positioned generally between the side of the occupant's thorax and head and the side door or panel 21 of the vehicle. The air bag 40 depicted in FIG. 1 is sufficiently large to protect the thorax and shoulder regions as well as the neck and head of the occupant. The top part of the air bag may include a lobe 114 which when inflated is rearward facing and covers the D-ring 116 typically mounted to the B-pillar 116 of the vehicle providing added protection for the head.

Figure 2:
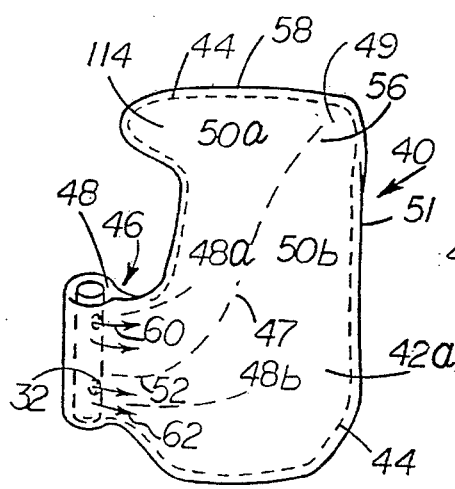
FIG. 2 shows a side plan view of a first embodiment of the invention.
Figure 3:
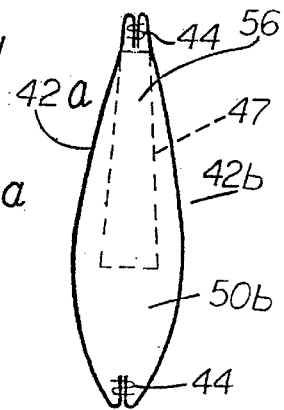
FIG. 3 illustrates a front plan view of the first embodiment of the invention.

Reference is made to FIGS. 2 and 3 which illustrate a cross-sectional view and end plan view of a typical air bag 40 constructed in accordance to the present invention. The air bag comprises two side panels 42a and 42b joined at a common seams 44. The assembled air bag includes a neck portion 46 defining an air inlet opening 48 through which inflation gas is received from the inflator 30. The air bag is separated into an upper 50a and a lower chamber 50b by a flat piece of air bag fabric, i.e. a separator 47 is sewn in between the side panels 42a and b. An end 52 of the separator 46 is positioned proximate the opening 48 of the neck portion dividing it into two parts 48a and 48b to divert inflation gas into the upper chamber 50a and the lower chamber 50b. In the illustrated embodiment the volume of the upper chamber is about one-half that of the lower chamber 50b. In absolute terms the volume of the upper chamber is about one-third of the volume of the entire air bag. The output flow characteristics of inflators vary. As an example a typical, cylindrically shaped, solid propellant inflator includes a plurality of uniformly situated exit ports and as such inflation gas distribution across the inflator is more or less uniform. By varying the distribution of the exit ports the percentage of inflation gas flowing form one end of the inflator can be made different from another end. The flow distribution exiting a typical cylindrically shaped hybrid inflator is generally concentrated at one end due to the fact that the body of the hybrid inflator is a pressure vessel and exit ports cannot be located in the pressure vessel. A sleeve or manifold is typically placed about the hybrid inflator to distribute the inflation gas more uniformly about the length of the inflator. By varying the configuration of the holes of the sleeve or manifold the distribution of the inflation gas can be such that a predetermined portion of the inflation gas exits from one end of the manifold and another predetermined proportion of gas exits from the other end of the inflator. Assuming for example that the inflator is configured to produce an even gas distribution across its length it can be appreciated that the upper chamber, because of its smaller volume will fill more rapidly than the larger lower chamber. If it is desired to more rapidly fill the upper chamber, the exit ports of the inflator and/or associated manifold can be configured such that a greater portion of the inflation gas is communicated to the upper chamber than to the lower chamber. The separator 47 includes an upper end 56 that extends toward the top 58 of the air bag. The end 56 of the separator my be connected to the top 58 of the air bag or to its end 51 or may be spaced therefrom to provide a passage 49 between the chambers to permit inflation gas to be communicated therebetween depending upon the pressure levels of the chambers. The operation of the air bag and associated inflator is as follows: Upon activation of the inflator the inflation gas is communicated to the neck opening 48. The inflation gas generally shown by arrows 60 and 62 is diverted by the separator into openings 48a and b and into the head or upper chamber 50a and into the lower or thorax portion of the bag 50b.

Figure 4:
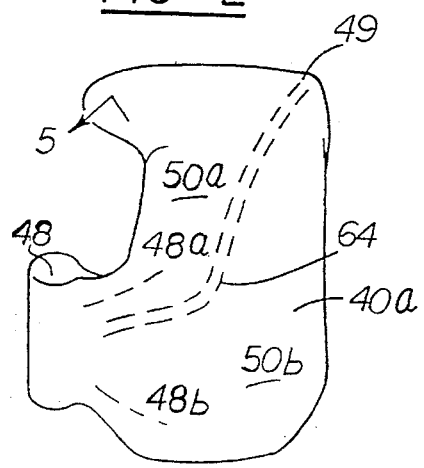
FIG. 4 illustrates a side plan view of another embodiment of the invention.
Figure 5:
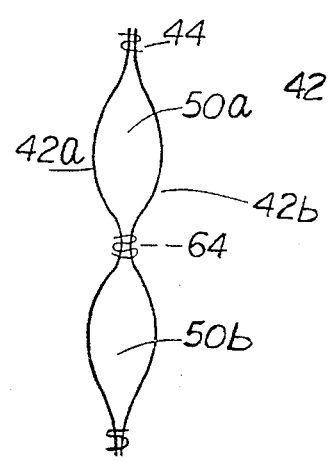
FIG. 5 shows a cross-sectional view of this second embodiment.

Reference is made to FIGS. 4 and 5 which illustrate another embodiment of the present invention showing an alternate air bag 40a. The separator 46 has been removed and replaced by a single or reinforced seam 64 that pinches or joins the panels 42a and b together. The seam 64 also functions to separate the bag 40a into its upper and lower chambers. The inclusion of the seam 64 strengthens the bag and also prevents it from bending laterally as it inflates. The operation of this air bag 40a is essentially identical to the operation of bag 40. The seam may terminate at the top or end of the air bag or be spaced therefrom to form a passage such as 49.

Figure 6:
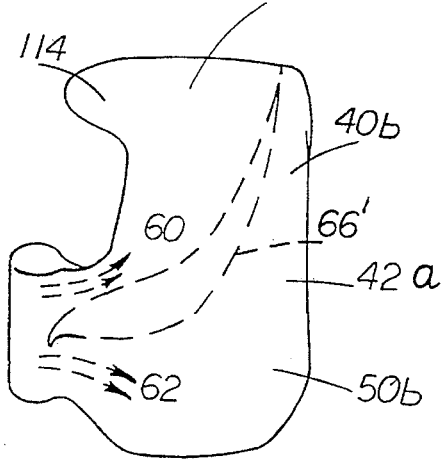

Reference is made to FIG. 6 which illustrates a cross-sectional view of an air bag 40b where the single seam 64 connecting panels 42a and 42b and diverting air flow between the two chambers of the air bag has been replaced with an elliptically shaped seam 66 which acts as an air foil to also divert the input gas flow stream into the neck inlet openings 48a, 48b and into the upper and lower chambers 50a and 50b of the air bag 40b. The utilization of the elliptically shaped seam 66' provides for a more robust interconnection of the side panels 42a and 42b than might be achieved with the single or line type of seam 66. The seam 66 may also terminate at the top or end of the air bag or be spaced therefrom to form a passage such as 49 as in the first embodiment.

Figure 7:
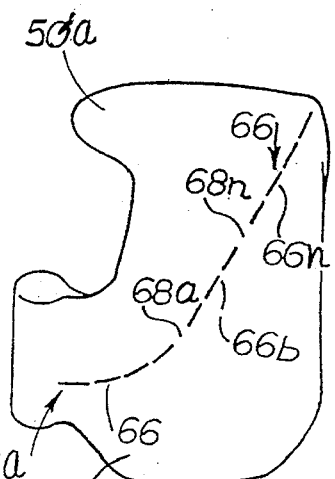
FIGS. 6–8 show side plan views of additional embodiments of the invention.

Reference is made to FIG. 7 which illustrates a further embodiment of the present invention. In this embodiment the seam 66 has been separated into two or more parts 66a, 66b–66n, defining a plurality of passages 68a–68n between which function as vent holes to communicate the upper and lower chambers 50a and 50b. The purpose of these vent holes is to communicate inflation gas between chambers. With the air bag configured as shown in FIG. 7 if the lower chamber 50b is loaded by the thorax its pressure will increase as the lower chamber is compressed. If the pressure increases to a level greater than the pressure in the upper chamber 50a inflator gas will be urged, in a delayed manner, that is after it received inflation gas from the inflator, into the upper chamber increasing its pressure and providing additional inflation gas in the head portion of the bag to cushion the occupant's head.

Figure 8:
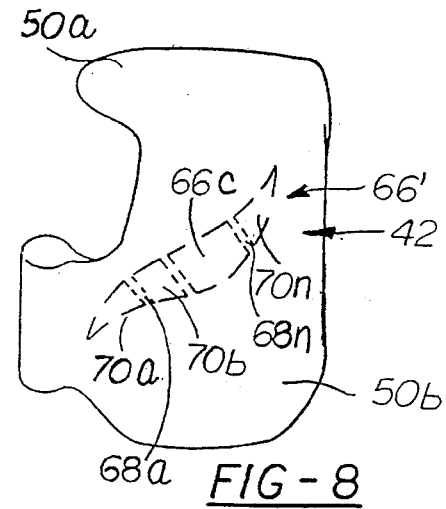

The air bag 40b shown in FIG. 8 is substantially identical to that shown in FIG. 7 having the various panels 42a,b and the elliptical sew seam 66' interconnecting the side panels. The seam 66' is broken into a plurality of segments each of which includes additional connecting seams such as 70a and 70b defining a flow passage 68a–n between the upper and lower chambers 50a and 50b. The operation of this bag is essentially the same of that of FIG. 7.

With reference again to FIG. 1 an added embodiment is shown. Reference is made to the line 70 shown on the air bag 40. The top portion of each of side of the air bag above line 70, is either coated (zero permeability) such as with silicon or constructed of a woven material of an extremely low permeability such as less than as an example 1 cfm at a pressure drop of 0.5 psi. The lower portion of each air bag side is either uncoated or constructed with a more permeable weave. As is known any air bag will begin to lose its internal pressure as inflation gas flows through the individual woven fiber strands. By coating the upper portion of the air bag or constructing it of a low permeability material the inflation gas will be trapped in the upper part of the bag for a longer time enhancing head protection. In this type of bag the separator 46 or separation seam 66 or 66' may be eliminated or used. It should be appreciated that each of the embodiments shown in FIGS. 2–8 can be used in an air bag in which its upper portions are coated or made of a low permeability material.

Figure 9:
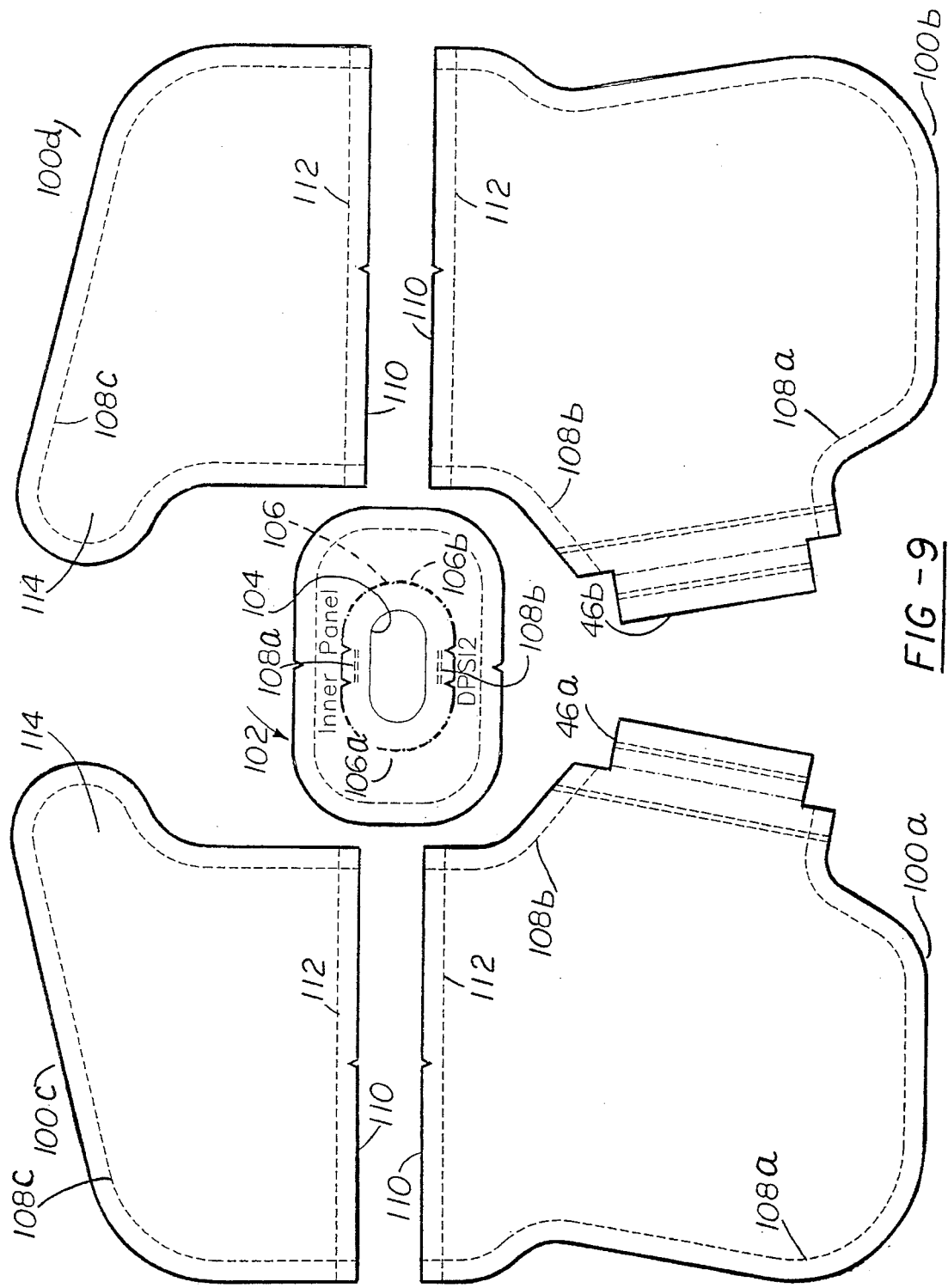
FIG. 9 shows a material layout for another embodiment of the invention.
Figure 11:
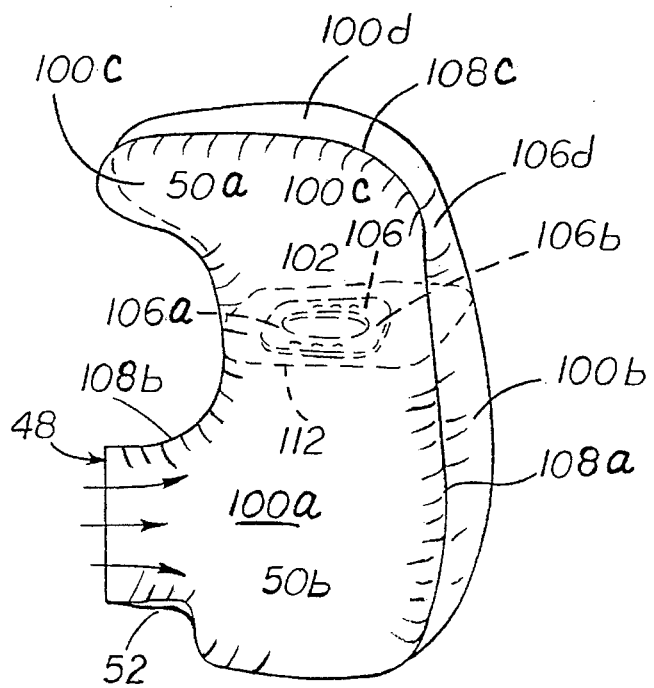
FIG. 11 shows an inflated air bag in accordance with the last embodiment.
Figure 10:
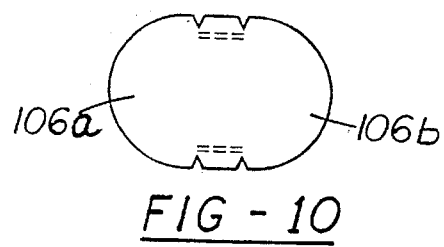
FIG. 10 is an isolated view of a vent cover.

Reference is made to FIGS. 9, 10 and 11. FIG. 9 illustrates a disassembled air bag 40d comprising four panels 100a–d. Each lower panel 100a,b includes a neoprene coated neck portions 46a and 46b which are wrapped about and secure the air bag to an inflator. The coating provides added resistance to heat damage from the inflator. The remaining portions of each lower panel is typically woven and coated. The upper panels 100c,d may be coated such as with silicon or made of a low permeability woven material. Also shown in FIG. 9 is an inner panel 102 which separates the air bag into the two chambers 50a and 50b. The inner panel or separator 102 includes at least one vent hole 104. The vent hole is covered by a vent cover 106, shown in isolation in FIG. 10. The vent cover is secured at for example two locations 108a,b to the vent panel with the cover in the upper chamber 50a. The free ends 106a,b of the vent cover 106 move up and down to open and close the vent hole as a function of the pressure differential between the chambers.

Lower panels 100a,b are sewn together about seams 108a and 108b forming a lower portion of the air bag. The upper panels 100c,d are similarly sewn together along seam 108c forming the upper portion of the air bag. Thereafter panel 108a is joined to panel 108c and panel 108b joined to panel 108d at edges 110 along seams 112 defining a single chamber air bag. If it is desired that the edges of the seams be hidden the bag is reverse by pulling it through the opening 48 of the neck portion. Thereafter the lower assemble panels 100a,b may be pulled out of the neck exposing the seam 112. The vent panel or separator 104, with cover 106 attached, is secured to the ends of the panels 100a–d proximate the seam 112. The assemble bag is shown in FIG. 11.

Figure 12:
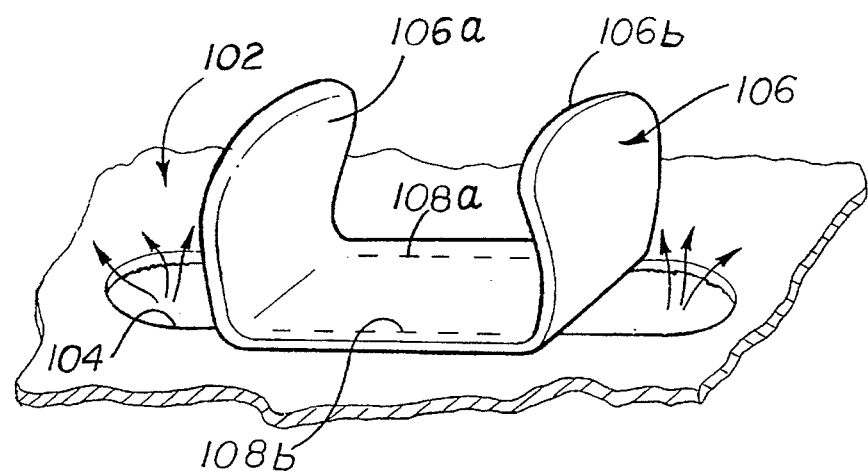
FIG. 12 shows a lifted vent cover.

The operation of this air bag 40c is slightly different than the earlier described bags in that all of the inflation gas from the inflator 40 is first received in the lower chamber 50b. As the pressure in chamber 50b rises it lifts the vent cover see FIG. 12 to permit inflation gas to enter the upper chamber and also fill same. If during an accident the occupant first loads the lower chamber or torso portion of the bag inflation gas will be urged into the upper chamber further filling same. This action maintains the upper chamber pressure at an increased pressure level for an extended period of time due to the compression of the lower chamber. Air flow from the upper chamber to the lower chamber is prevented when the flaps or free ends of the vent cover close the vent opening 114. It should be appreciated that the vent cover operates as a check valve and if desired can by eliminated. Further, the single vent opening 104 may be replaced by a plurality of smaller openings with or without individual covers or check valves. Additionally, check valves can be added at the ends of passages 68a–68n in the air bag of FIGS. 7 and 8.

Many changes and modifications in the above described embodiment of the invention can, of course, be carried out without departing from the scope thereof. Accordingly, that scope is intended to be limited only by the scope of the appended claims.

We claim:

1. A side impact air bag for protecting the side and head of an occupant during a crash or vehicular impact comprising:

a first side joined to a second side, separating means, a portion of which is located proximate a neck portion of the air bag, consisting of a sew pattern (46) joining the first and second sides and dividing the bag into upper and lower chambers and for diverting a predetermined quantity of inflation gas, received from an inflation gas source directly into the upper and lower chambers.

2. The apparatus as defined in claim 1 wherein the sew pattern (66) is elliptically shaped having the shape of an air foil to divert the inflation gas into the chambers.

3. The apparatus as defined in claim 1 wherein the sew pattern is segmented to define flow passages (68) between the upper and lower chambers.

4. The apparatus as defined in claim 2 wherein the elliptically shaped sew pattern (66') is segmented to define flow passages between the upper and lower chambers.

5. The device as defined in claim 1 wherein the upper chamber includes a rearward extending lobe (114).

6. The device as defined in claim 5 wherein the rearward extending lobe (114) is positioned, upon inflation of the air bag, between the occupant's head and an object located on the side of the vehicle.

7. The apparatus as defined in claim 1 wherein the gas source comprises a plurality of exit ports arranged to communicate a uniform gas flow to the neck portion and separator means, wherein the quantity of inflation gas diverted into the upper and lower chambers contributes to define the inflation pressure within each chamber.

8. A side impact air bag having a stored condition in which the bag is located within a vehicle seat and an inflated condition in which the bag is generally located between an occupant to be protected and an adjacent side of a vehicle, the side impact air bag comprising:

an inflatable upper chamber (50a) in fluid communication with an inflatable lower chamber (50b), the upper chamber when inflated being positioned between the occupant's head and the side of the vehicle;

the lower chamber (50b) having a neck portion (52), remote from the upper chamber, for receipt of inflation gas from a cooperating inflation gas source (30), wherein when inflated the lower chamber is positioned between the occupant's torso and the side of the vehicle and loaded and compressed by the torso during a crash;

a separator (102) disposed between the upper chamber and the lower chamber, the separator including at least one hole (104) to communicate inflation gas between the lower chamber and the upper chamber as the occupant's torso compresses the lower chamber increasing the pressure in the lower chamber forcing inflation gas previously within the lower chamber into the upper chamber.

9. The device as defined in claim 8 wherein the upper chamber includes a rearward extending lobe (114).

10. The device as defined in claim 9 wherein the lobe extends reward to cover a protruding object generally located on the side of the vehicle, and wherein when the lobe is inflated it is generally positioned between the occupant's head and the object.

11. The apparatus as defined in claim 8 wherein the at least one hole is covered by a corresponding flap valve means for permitting flow thereacross when pressure in the lower chamber exceeds pressure in the upper chamber and prevents flow when the pressure in the upper chamber exceeds the pressure in the lower chamber.

12. A method of inflating the side impact air bag defined in claim 8, the method comprising the steps of:

a) communicating inflation gas to the lower chamber of the air bag to inflate same;

b) permitting inflation gas to flow into the upper chamber through the at least one hole in the separator;

c) disposing the inflated lower chamber of the air bag between the torso of the occupant and the side of the vehicle and d) loading the lower chamber of the air bag with the occupant's torso during a side impact accident forcing inflation gas into the upper chamber of the air bag.

* * * * *